(12) United States Patent
Vlahogeorge

(10) Patent No.: US 10,486,120 B2
(45) Date of Patent: Nov. 26, 2019

(54) FLOATING HORIZONTAL AERATOR FOR A BODY OF WATER

(71) Applicant: John T. Vlahogeorge, West Lafayette, IN (US)

(72) Inventor: John T. Vlahogeorge, West Lafayette, IN (US)

(*) Notice: Subject to any disclaimer, the term of this patent is extended or adjusted under 35 U.S.C. 154(b) by 79 days.

(21) Appl. No.: 15/485,296

(22) Filed: Apr. 12, 2017

(65) Prior Publication Data

US 2018/0296989 A1 Oct. 18, 2018

(51) Int. Cl.
| | | |
|---|---|---|
| B01F 13/00 | (2006.01) | |
| C02F 7/00 | (2006.01) | |
| C02F 103/20 | (2006.01) | |
| B01F 3/04 | (2006.01) | |

(52) U.S. Cl.
CPC .......... *B01F 13/0049* (2013.01); *C02F 7/00* (2013.01); *B01F 3/04524* (2013.01); *C02F 2103/20* (2013.01)

(58) Field of Classification Search
CPC ............. B01F 3/04517; B01F 3/04524; B01F 13/0049; B01F 3/04751; B01D 21/2466; C02F 7/00; C02F 2103/20; Y02W 10/15
See application file for complete search history.

(56) References Cited

U.S. PATENT DOCUMENTS

| | | | | |
|---|---|---|---|---|
| 3,224,170 A | * | 12/1965 | Iwanaga | B01D 47/025 261/123 |
| 3,490,752 A | * | 1/1970 | Danjes | B01F 3/04241 210/220 |
| 3,764,011 A | * | 10/1973 | Owens | B01D 21/00 210/192 |
| 3,984,323 A | * | 10/1976 | Evens | B01F 3/0451 210/220 |
| 4,072,612 A | * | 2/1978 | Daniel | A01K 63/042 210/167.23 |
| 4,083,661 A | * | 4/1978 | McPherson | F04B 49/04 137/416 |
| 4,086,306 A | * | 4/1978 | Yoshinaga | A01K 63/047 210/219 |
| 4,181,614 A | * | 1/1980 | Steenhorst | B01D 21/2466 210/221.2 |

(Continued)

FOREIGN PATENT DOCUMENTS

| | | | | |
|---|---|---|---|---|
| CA | 2707580 A1 | * | 6/2009 | .......... B01F 3/04517 |
| CN | 101508493 | * | 8/2008 | |

(Continued)

OTHER PUBLICATIONS

Google translation of Li et al. CN 101508493 published Aug. 19, 2008 (Year: 2008).*

(Continued)

*Primary Examiner* — Stephen Hobson
(74) *Attorney, Agent, or Firm* — Woodard, Emhardt, Henry, Reeves & Wagner, LLP

(57) ABSTRACT

An aerator for adding oxygen to a body of water. A pair of tubes is mounted to a plate, in turn, connected to a pair of floats suspending the aerator in the body of water. A source of pressurized air directs air flow through the tubes forcing water flow into the tubes and out vertical risers whereat the oxygenated water then falls back onto the body of water.

20 Claims, 4 Drawing Sheets

(56) References Cited

U.S. PATENT DOCUMENTS

| | | | | |
|---|---|---|---|---|
| 4,191,479 | A * | 3/1980 | Shuck | B01F 3/04765 114/264 |
| 4,350,589 | A * | 9/1982 | Stog | B01F 3/0876 210/220 |
| 4,376,048 | A * | 3/1983 | Kovacs | B01D 21/0084 210/221.1 |
| 4,514,343 | A * | 4/1985 | Cramer | B01F 3/04588 210/221.2 |
| 5,161,914 | A * | 11/1992 | Rahn | B09C 1/005 405/128.2 |
| 5,294,340 | A * | 3/1994 | Stog | C02F 1/006 210/150 |
| 5,554,291 | A * | 9/1996 | Scanzillo | C02F 3/02 210/150 |
| 5,755,976 | A * | 5/1998 | Kortmann | B01F 3/04517 210/137 |
| 6,220,822 | B1 * | 4/2001 | Khudenko | F04F 1/18 417/54 |
| 6,231,766 | B1 * | 5/2001 | Hausin | B01F 3/0412 210/150 |
| 6,322,055 | B1 * | 11/2001 | Speece | B01D 19/0005 261/123 |
| 6,878,295 | B2 * | 4/2005 | Hubenthal | B01D 21/2461 210/220 |
| 7,105,096 | B2 * | 9/2006 | Meurer | B01D 21/0003 137/8 |
| 7,874,548 | B1 * | 1/2011 | McGuffin | B01F 3/04517 210/242.2 |
| 8,016,273 | B1 * | 9/2011 | Dartez | B01F 3/04113 261/120 |
| 8,079,572 | B2 * | 12/2011 | Schaefer | B01D 63/024 261/121.1 |
| 8,128,741 | B2 * | 3/2012 | Maeda | A01K 63/042 210/150 |
| 8,372,274 | B2 | 2/2013 | Early et al. | |
| 8,372,277 | B2 * | 2/2013 | Kania | A01G 31/02 210/150 |
| 9,206,740 | B2 * | 12/2015 | Wong | F01D 25/002 |
| 9,434,631 | B2 | 9/2016 | Vlahogeorge | |
| 10,022,688 | B2 * | 7/2018 | Keeton, Jr. | B01F 13/1025 |
| 2003/0102580 | A1 * | 6/2003 | Khudenko | B01F 3/04517 261/77 |
| 2005/0242450 | A1 * | 11/2005 | Witheridge | B01F 3/04517 261/77 |
| 2006/0033341 | A1 * | 2/2006 | Kaufman | F01C 11/006 290/54 |
| 2006/0151385 | A1 * | 7/2006 | Burrows | C02F 7/00 210/600 |
| 2014/0110323 | A1 * | 4/2014 | Al-Anzi | C02F 7/00 210/200 |
| 2015/0108054 | A1 * | 4/2015 | Bleth | B01F 3/04517 210/170.09 |
| 2016/0039699 | A1 * | 2/2016 | Vlahogeorge | C02F 11/00 137/565.01 |
| 2017/0158995 | A1 * | 6/2017 | Garvik | C12M 21/02 |

FOREIGN PATENT DOCUMENTS

| | | | | |
|---|---|---|---|---|
| DE | 1517592 A1 | * | 12/1969 | B01F 3/04517 |
| DE | 2119638 A1 | * | 11/1972 | B01F 3/04773 |
| DE | 2502660 A1 | * | 8/1975 | B01F 3/04517 |
| DE | 2649500 A1 | * | 5/1977 | A01K 63/042 |
| DE | 2844934 B1 | * | 10/1979 | A01C 3/026 |
| DE | 3227672 A1 | * | 2/1984 | B01F 3/0412 |
| DE | 3833003 A1 | * | 4/1990 | B01F 3/04262 |
| DE | 4123814 A1 | * | 1/1993 | B01F 3/04262 |
| DE | 4325010 A1 | * | 2/1995 | B01D 21/245 |
| DE | 202018001727 U1 | * | 4/2018 | C02F 3/201 |
| EP | 0238773 A1 | * | 9/1987 | B01F 3/0473 |
| FR | 772684 A | * | 11/1934 | B01F 3/04517 |
| FR | 1445273 A | * | 7/1966 | B01F 3/04106 |
| FR | 2398024 A1 | * | 2/1979 | B01F 3/0412 |
| FR | 2887470 A1 | * | 12/2006 | B01F 3/0446 |
| GB | 2074883 A | * | 11/1981 | A01K 63/042 |
| GB | 2316014 A | * | 2/1998 | B01F 3/04113 |
| JP | 4022565 B1 | * | 12/2007 | B01F 3/04517 |
| WO | WO-0185623 A1 | * | 11/2001 | B01F 3/04248 |
| WO | WO-2008123467 A1 | * | 10/2008 | A01K 63/042 |
| WO | WO-2011020142 A1 | * | 2/2011 | B01F 3/04106 |

OTHER PUBLICATIONS

Air compressor Wikipedia published Oct. 21, 2015 accessed at <https://en.wikipedia.org/w/index.php?title=Air_compressor&oldid=686811821> (Year: 2015).*

* cited by examiner

FLOATING HORIZONTAL AERATOR FOR A BODY OF WATER

BACKGROUND OF THE INVENTION

Field of the Invention

The present invention relates generally to the field of aerators to oxygenate large bodies of water.

Description of the Prior Art

When raising various animals including shrimp or fish in ponds or tanks, it is necessary to maintain the oxygen content of the water. Nevertheless, various factors automatically decrease the oxygen and thus aerators have been provided to circulate the water that is then directed back into the pond or tank increasing the oxygen content. There are many kinds of mechanical aerators. For example, one bubbler aerator is the diffused air aeration system that releases air bubbles at the bottom of the pond or tank with the bubbles then rising upward to the water top surface.

In my U.S. Pat. No. 9,434,631 of Sep. 6, 2016, I have disclosed an apparatus for removing sludge from a reservoir of liquid. A hollow tube extends across the bottom of the reservoir and is connected to an external source of pressurized air directing the air into the tube forcing water therein towards the opposite end to a vertically extending exit pipe. The tube includes a plurality of water inlets extending along the length thereof allowing water within the reservoir to enter the tube. A triangular shaped insert located within the tube extends the length thereof and is shaped to increase the water flow.

Typically, with many of the prior aerators, a large amount of energy is required to move the water with sludge across the reservoir and then upwardly where the sludge is removed. The water must not only be moved along the length or width of the reservoir but also lifted. As a result, the energy required to both move the water horizontally and then lift water outwardly from the reservoir is increased. Disclosed herein is an energy efficient, high water moving aerator that improves the environment for raising animals in various types of reservoirs.

It can be appreciated that labor requiring time and financial resources increases in order to install a horizontally extending aeration tube along the bottom of a reservoir. I have therefore devised a floatable aerator that can easily be moved into the reservoir as a result of connecting the aerator to a float. A water moving tube on the float is located either at the top surface of the reservoir or between the top surface and the bottom of the reservoir. A source of pressurized air external to the reservoir is then connected to the aerator that is secured in place by external lines or other ties.

A sample of the prior art includes the U.S. Pat. No. 4,181,614 disclosing a horizontally extending tube having a sloping inverted channel connected at its highest point to a riser pipe. U.S. Pat. Nos. 7,105,096, 5,161,914 and 8,372,274 discloses various waste water treatment systems for moving the water and removing waste therefrom.

It is an object of the present invention to provide a new and improved device for aerating bodies of water.

A further object of the present invention is to provide an apparatus for aerating water while minimizing the energy required to move the water and lift the water upwardly from a reservoir.

Related objects and advantageous of the present invention will be apparent from the following description.

SUMMARY OF THE INVENTION

One embodiment of the present invention is an aerator floatable in a body of water having a top surface and a bottom comprising a float positionable in the body of water. A base is connected to the float. A first wall with an inlet end and an outlet end and side portions extends therebetween is supported by the float and has a portion spaced apart from the base forming a water passage extending between the inlet end and the outlet end. The side portions have an opening allowing water from the body of water to pass therethough and into the water passage. An insert is located in the water passage and includes an air passage with a plurality of air outlets along the length thereof. A source of pressurized air is connected to the air passage and operable to force air into the air passage and then out through the air outlets and into the water passage moving water in the water passage in a direction from the inlet end to the outlet end. Structure at the outlet end forms a vertically extending passage to direct water outward A ramp is located in the water passage directing the water impinging thereon upward through the vertically extending passage.

It is an object of the present invention to provide a new and improved device for aerating bodies of water.

A further object of the present invention is to provide an apparatus for aerating water while minimizing the energy required to move the water and lift the water upwardly from a reservoir.

Related objects and advantageous of the present invention will be apparent from the following description.

DESCRIPTION OF THE PREFERRED EMBODIMENTS

Figure 1:
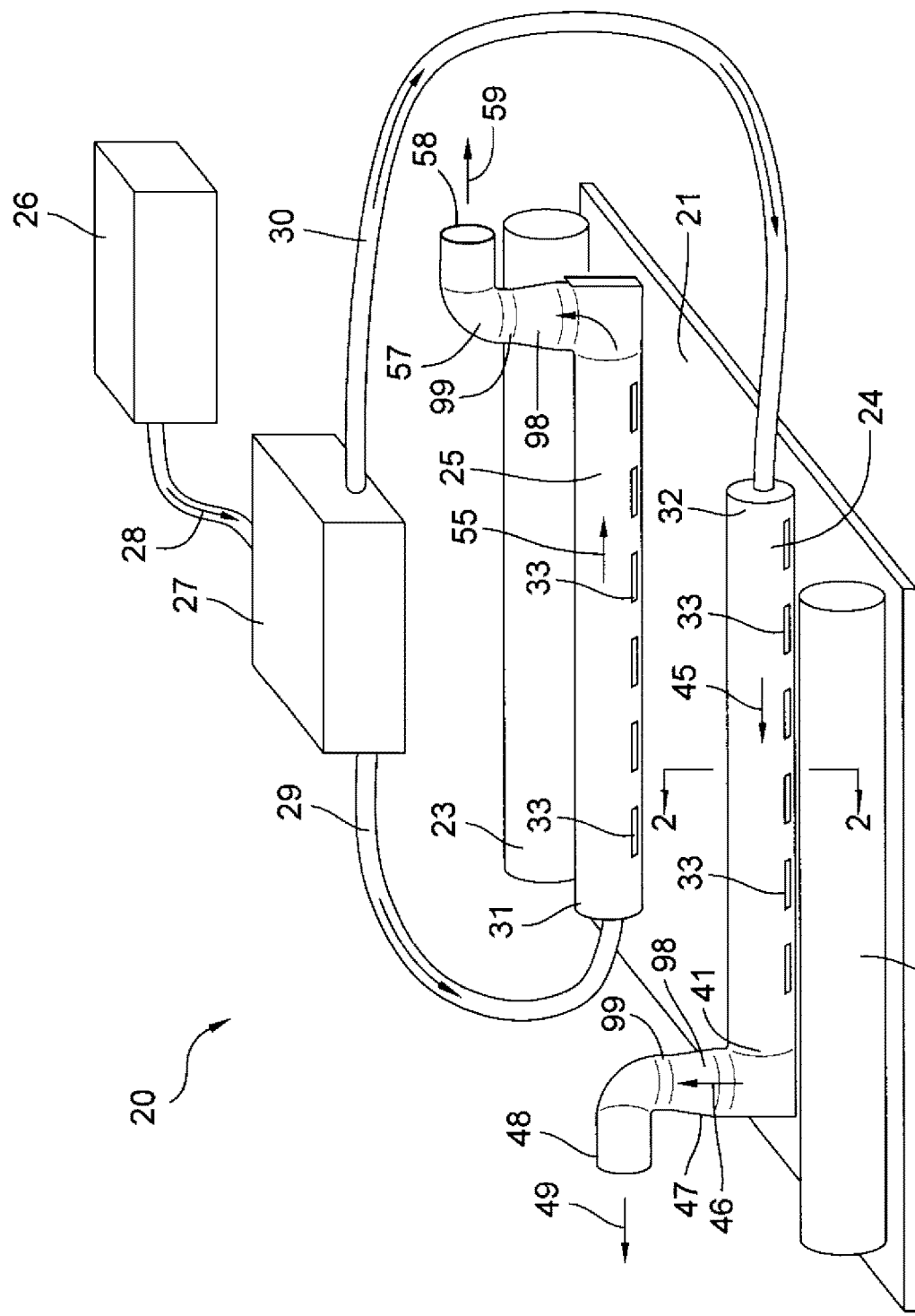
FIG. 1 is a top perspective view of the preferred embodiment of the aerator incorporating the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The embodiment of the horizontal extending aerator shown in FIG. 1 locates a pair of water collecting tubes along the top surface of a body of water, such as, a reservoir, pond or tank whereas the alternate embodiment of the aerator locates the water collecting tubes beneath the top surface of the body of water but above the bottom of the body of water. In both versions, are supported by floats thereby allowing the apparatus to be quickly installed within the water. Both embodiments have a source of pressurized air located external to the body of water which is then connected to a pressurized air tank located on the floats. The tank is then connected to an end of each water collecting tube to force water therein along the length of the tube and then upwardly above the top surface of the body of water.

In the preferred embodiment, the aerator 20 includes a plate 21 having a pair of air tight tubular floats 22 and 23 connected thereto and typically installed atop or to the side of the lengthwise extending side portions of plate 21. A pair of water collecting tubes 24 and 25 is mounted atop plate 21 thereby being supported by floats 22 and 23. The tubes 24 and 24 extend along the top surface of the body of water; however have slots 33 located slightly beneath the top surface allowing water to enter the tubes. A source of pressurized air 26 is located external of the body of water and is operable to route via conduit 28 the pressurized air to a baffle tank 27 mounted atop plate 21. A pair of conduits 29 and 30 route pressurized air from tank 27 to ends 31 and 32 respectively of water collecting tubes 25 and 24.

Water collecting tubes 24 and 25 are identically constructed. Each includes a curved wall mounted atop plate 21 forming a water passage extending between the opposite ends of the tube. Slots 33 positioned beneath the top surface of the body of water are provided in each of the opposite side walls of each tubes 24 and 25 allowing water from the body of water to enter into the water passage.

Figure 2:
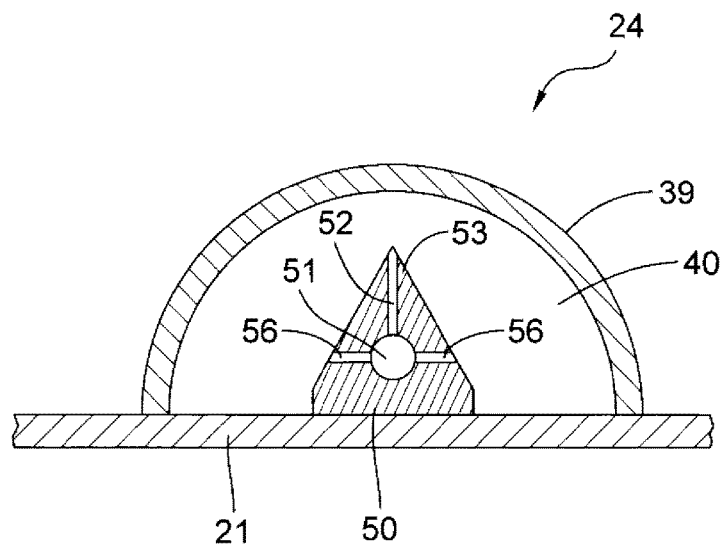
FIG. 2 is an enlarged cross-sectional view taken along the line 2-2 of FIG. 1 and viewed in the direction of the arrows.
Figure 3:
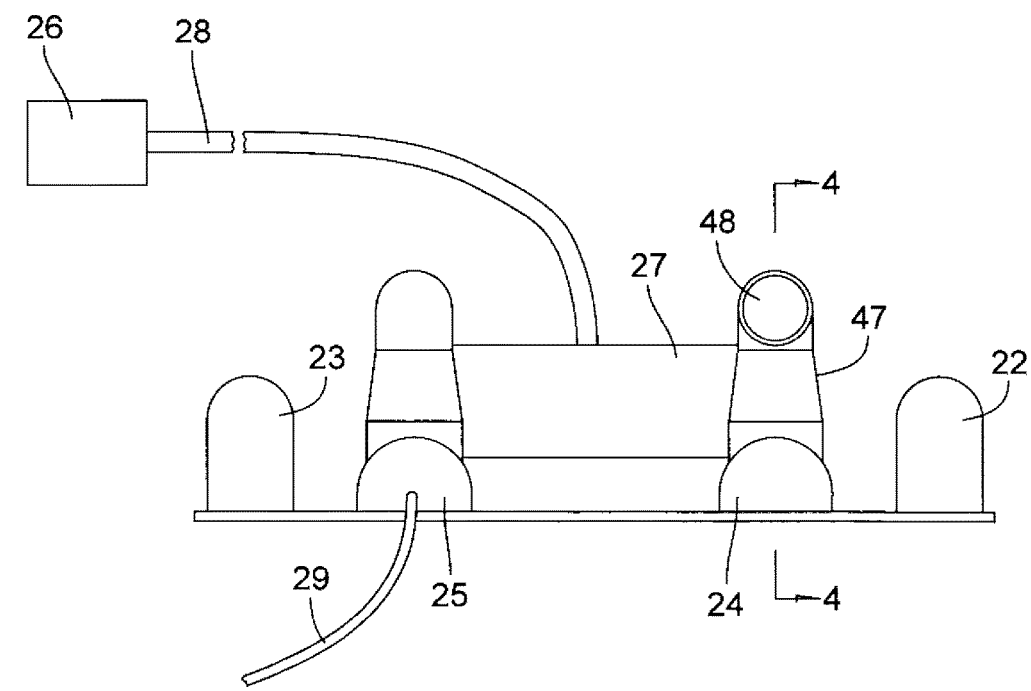
FIG. 3 is an end view of the aerator.

A cross-section of tube 24 is shown in FIG. 2. Tube 24 includes a curved wall 39 mounted to plate 21 forming a water passage 40 extending from end 32 of the tube to the opposite end 41 of the tube. Slots 33 are provided in wall 39 to allow water in the body of water to flow into passage 40.

Figure 4:
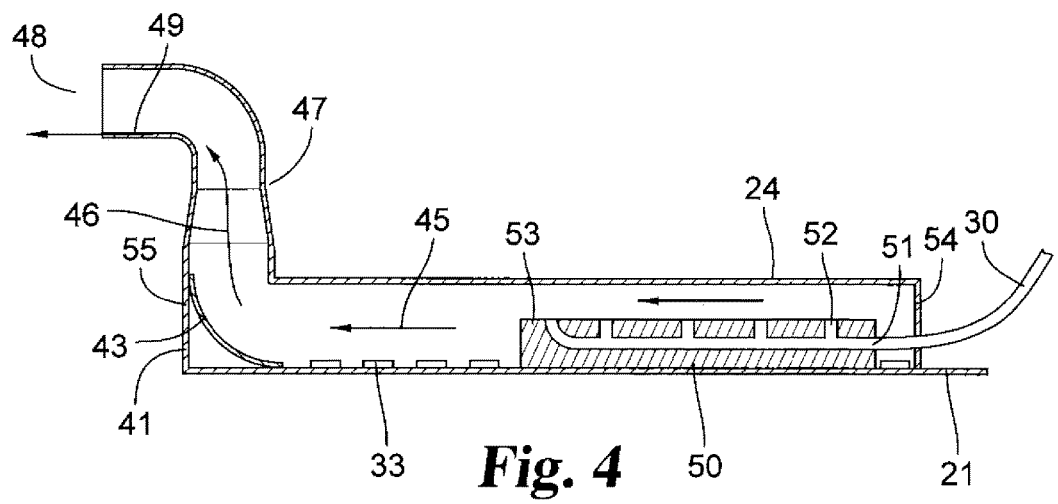
FIG. 4 is a cross-sectional view taken along the line 4-4 of FIG. 3 and viewed in the direction of the arrows.

A length-wise cross sectional view of tube 24 is shown in FIG. 4 illustrating the position of a 90 degree baffle ramp 43 which directs the water flowing through tube 24 in the direction of arrow 45 through a 90 degree turn with the water then flowing vertically upward in the direction of arrow 46 through riser tube 47 having an outlet 48 with the water exiting the system in the direction of arrow 49 above the top surface of the body of water and then falling back onto the top surface of the body of water.

Riser tubes 47 and 57 each have a bottom hollow portion 98 having a frusto-conical shape with an internal cross sectional area that decreases from the ends attached to the horizontally extending tubes 24 and 25 to the top ends of bottom portions 98 where portions 98 are attached to a constant diameter hollow tube 99.

Air emitter 50 (FIGS. 2 and 4) is mounted atop plate 21 and is located entirely within passage 40 of tube 24. An air passage 51 extends through emitter 50 and is connected to conduit 30, in turn, connected to the tank of pressurized air 27. Emitter 50 has a truncated triangular configuration with a pointed top 53. A plurality of air outlets 52 are located at and along the length of top 53 and are in communication with air passage 51. In addition, a plurality of side air outlets 56 are located along the length of the emitter and are in communication with air passage 51. Emitter 50 extends from immediately inside passage 40 adjacent end cap 54 toward the opposite end cap 55 sealing the end 41 of the tube end. Emitter 50 may extend substantially along the length of tube 24; however, it is unnecessary for the emitter to extend the entire length of tube 24. As pressurized air enters passage 51 from tube 30, the air escapes via outlets 52 and 56 toward ramp 43 located at end 41 of the tube. Water enters tube 24 via slots 33 with the air then forcing the water to flow towards end 41 impinging ramp 43 with the water then flowing vertically upward through riser tube 47 and exiting the system via outlet 48 and eventually falling downward onto the top surface of the body of water.

Tube 25 is identically constructed to tube 24 having slots 33, and includes an air emitter 50 and a ramp 43 being connected to the pressurized air tank 27 via conduit 29. Notably, the flow of the water through tube 25 is in the direction of arrow 55 which is in the opposite direction of the flow of water through tube 24 in the direction of arrow 45. Further, tube 25 has a vertical riser tube having an outlet 58 causing the water to flow in the direction of arrow 59 that is opposite of the water flow from outlet 48 in the direction of arrow 49.

Figure 5:
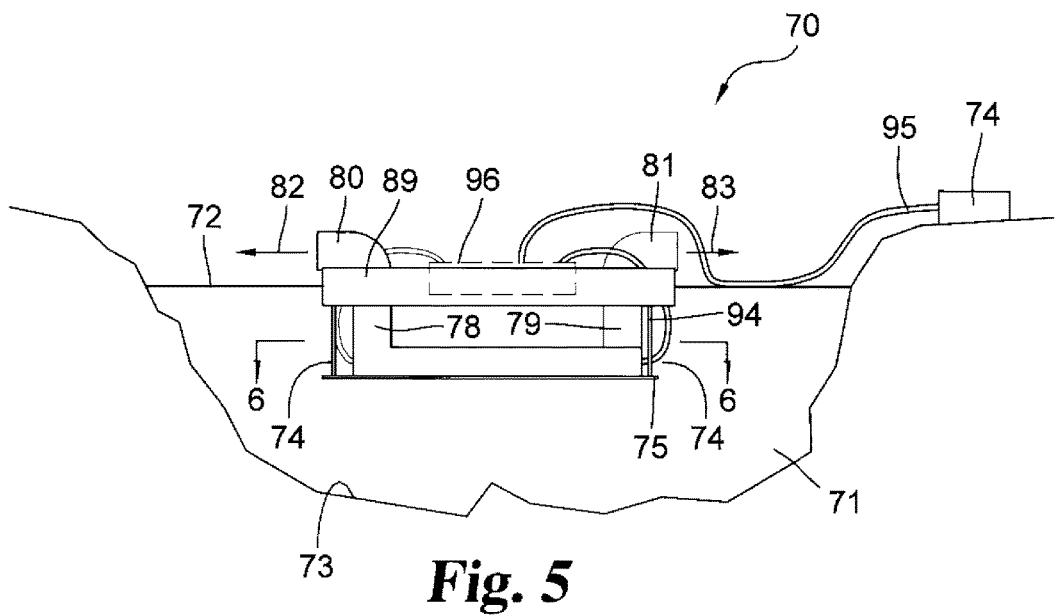
FIG. 5 is a side view of an alternate embodiment of the aerator positioned in a body of water.
Figure 6:
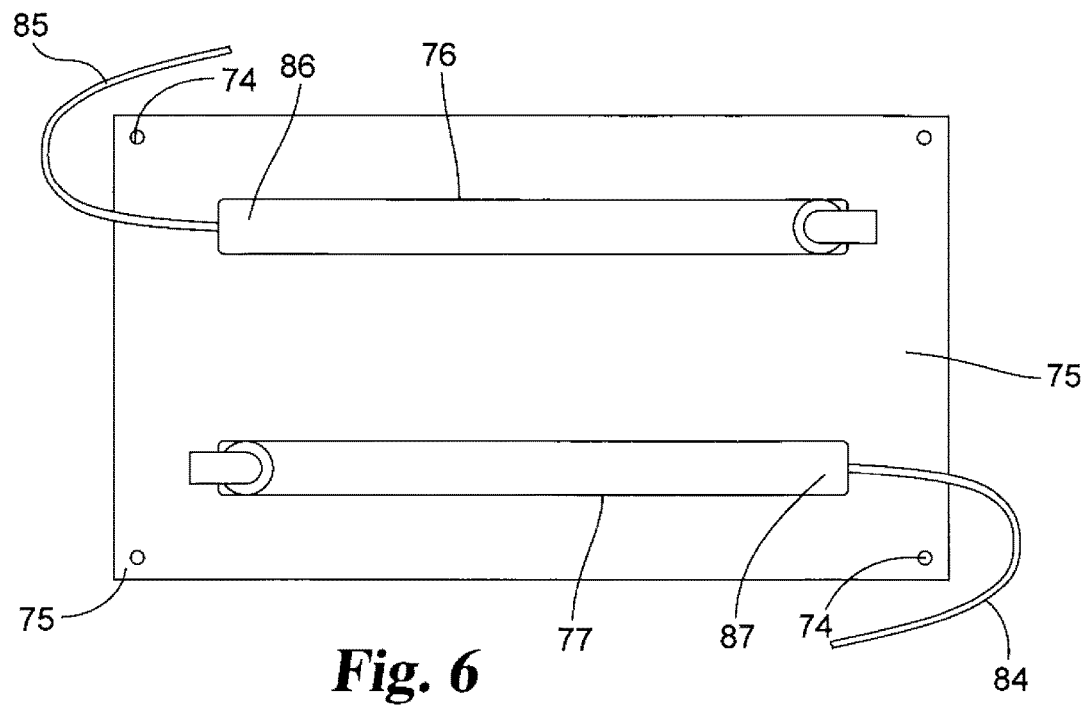
FIG. 6 is an enlarged cross-sectional view taken along the line 6-6 of FIG. 5 and viewed in the direction of the arrows.
Figure 7:
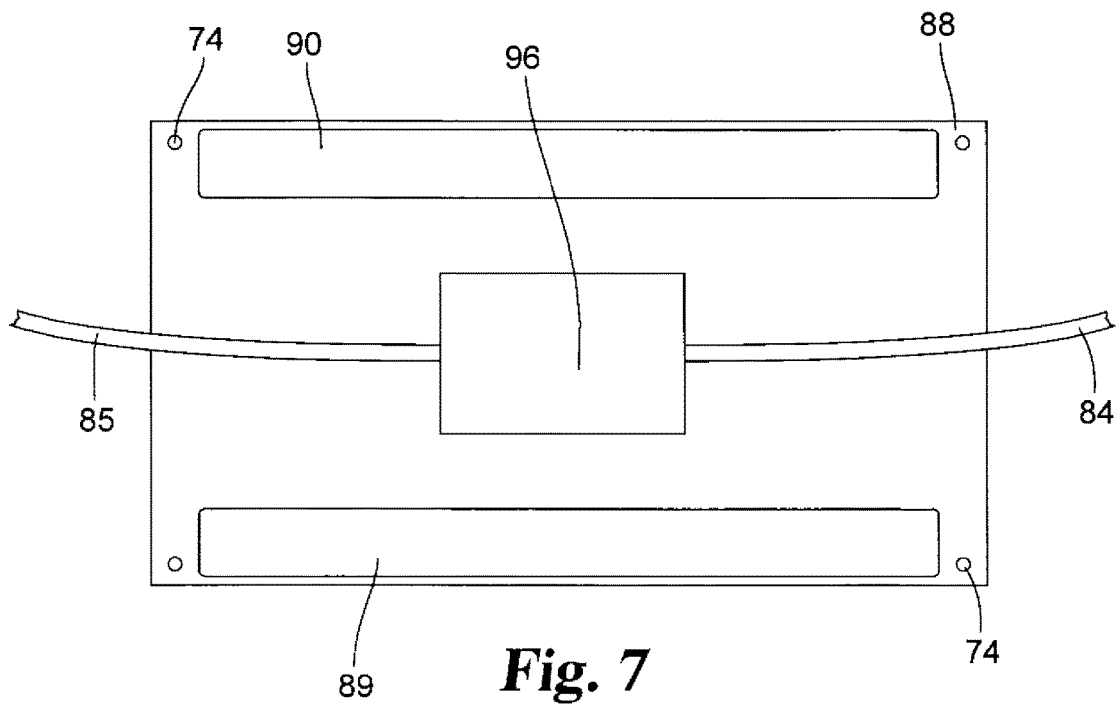
FIG. 7 is a top view the aerator of FIG. 5.

In the alternate embodiment of the horizontal extending aerator shown in FIGS. 5-7, the aerator 70 is constructed similar to aerator 20 of FIG. 1 with the exception that the two horizontally extending water collection tubes are located atop a second plate positioned between the top surface 72 of the body of water 71 and the bottom 73 of the body of water 71. The source of pressurized air 74 is located external to the water and is connected via conduit 95 to air baffle tank 96 located on a first plate 88 (FIG. 7) or other suitable structure having the pair of pressurized air tubular floats 89 and 90 atop the plate 88 keeping the apparatus afloat on the body of water. The horizontally extending tubes 76 and 77 for collecting water are not located atop or at surface 72 but instead are located between the top surface 72 and bottom 73 of the body of water 71. Best results have been obtained by locating tubes 76 and 77 approximately 40 inches to 48 inches below the top surface 72 of the water. A plurality of downwardly extending rods 74 are attached to bottom plate 75 which, in turn, has the water collecting tubes 76 and 77 located there atop. The pair of tubes 76 and 77 are identical to tubes 24 and 25 and have riser tubes 78 and 79 (FIG. 5) identical to riser tubes 47 and 57 (FIG. 1). Likewise, tubes 78 and 79 have respectively outlets 80 and 81 identical to outlets 48 and 58 orienting the outward flow of water in opposite directions located above the top surface 72 of the body of water with the water flowing from outlet 80 in the direction of arrow 82 and the water flowing from outlet 81 in the direction of 83.

The baffle tank 96 of pressurized air mounted atop top plate 88 is connected via conduits 84 and 85 (FIG. 7) to ends 87 and 86 respectively of tubes 77 and 76 mounted atop bottom plate 75. Each tube 76 and 77 has air emitters 50 identical as previously described for tubes 24 and 25 which are connected to the air conduits 84 and 85 thereby emitting pressurized air within tubes 76 and 77 having slots 33 extending through the side walls thereof allowing water to enter into each tube 76 and 77 and eventually exiting the system in opposite directions of arrows 82 and 83.

A top view of aerator 70 is shown in FIG. 7 illustrating the positioning of air tight floats 89 and 90 mounted atop or adjacent to a plate 88 or other type of structure holding the tank 96 with rods 74 mounted thereto and extending downwardly to the bottom plate 75. Floats 89 and 90 keep the entire system floating on the body of water locating the water collection tubes 76 and 77 between the top surface and bottom of the body of water.

Once aerator 70 is located in a body of water, the bottom plate 75 may be manually lowered to the desired elevation and locked in place. Rods 74 are fixedly mounted to the bottom plate 75 and are slidably mounted to the top plate 88. Once the bottom plate is lowered the desired distance from the top surface of the water, the rods are locked in place preventing relative motion between the top plate and the rods. Conventional fastening means, for example, by pinning the rods to the top plate, may be utilized to lock the rods in place.

While the invention has been illustrated and described in detail in the drawings and foregoing description, the same is to be considered as illustrative and not restrictive in character, it being understood that only the preferred and alternate embodiment has been shown and described and that all changes and modifications that come within the spirit of the invention are desired to be protected.

What is claimed is:

1. An aerator floatable in a body of water having a top surface and a bottom comprising:
    a float positionable in the body of water;
    a base connected to said float;
    a first wall with an inlet end and an outlet end and side portions extending therebetween being supported by said float and having a portion spaced apart from said base forming a water passage extending between said inlet end and said outlet end, said side portions having an opening allowing water from said body of water to pass therethough and into said water passage; an insert located in said water passage with a length extending from said inlet end toward said outlet end and including an air passage with a plurality of air outlets spaced along said length; and,
    a source of pressurized air connected to said air passage of said insert and operable to force air into said air passage and out said air outlets into said water passage moving water in said water passage in a direction from said inlet end to said outlet end;
    a structure forming a vertically extending passage to direct water outward; and, a ramp located in said water passage directing said water impinging thereon upward through said vertically extending passage.

2. The aerator of claim 1 and further comprising: an air tank supported by said float and connected to and between said source of pressurized air and said air passage of said insert.

3. The aerator of claim 1 and further comprising:
    a second wall with a second inlet end and a second outlet end and side portions extending therebetween being supported by said float and having a portion spaced apart from said base forming with said base a second water passage having openings allowing water from said body of water to pass therein; and,
    an second insert located in said second water passage with second length extending from said second inlet end toward said second outlet end and including a second air passage with a plurality of second air outlets along said second length; and wherein:
    said source of pressurized air directs pressurized air into said first air passage in a direction opposite from directing air into said second air passage.

4. The aerator of claim 3 wherein said float includes a pair of hollow sealed floatable tubes connected to said base and supporting said first wall and said second wall in said body of water.

5. The aerator of claim 4 wherein said floatable tubes position said first wall and said second wall on the top surface of the body of water.

6. The aerator of claim 4 and further comprising a tank located between said floatable tubes being connected to said source of pressurized air and said first inlet of said first wall and said second inlet of said second wall.

7. The aerator of claim 4 and further comprising: supports connected to said float and said base and locating said base and said first wall and said second wall entirely between said bottom of said body of water and said top surface with said structure extending upwardly in said body of water above said float and the top surface of said body of water allowing water to exit same above said float and said body of water and then fall downwardly.

8. The aerator of claim 1 wherein an uppermost portion of said vertically extending passage is positioned higher above said base than said float.

9. The aerator of claim 1 wherein said structure defining said vertically extending passage includes a frusto-conical segment.

10. The aerator of claim 9, wherein the conduit extends to a baffle tank supported by the base.

11. An aerator floatable in a body of water having a top surface and a bottom comprising:
    a float positionable in the body of water;
    a base connected to said float;
    a first wall with an inlet end and an outlet end and side portions extending therebetween being supported by said float and having a portion spaced apart from said base forming a water passage extending between said inlet end and said outlet end, said side portions having an opening allowing water from said body of water to pass therethough and into said water passage; an insert located in said water passage with a length extending from said inlet end toward said outlet end and including an air passage with a plurality of air outlets along said length; and,
    a source of pressurized air connected to said air passage of said insert and operable to force air into said air passage and out said air outlets into said water passage moving water in said water passage in a direction from said inlet end to said outlet end;
    a structure forming a vertically extending passage to direct water outward;
    a ramp located in said water passage directing said water impinging thereon upward through said vertically extending passage;
    an air tank supported by said float and connected to and between said source of pressurized air and said air passage of said insert;
    a second wall with a second inlet end and a second outlet end and side portions extending therebetween being supported by said float and having a portion spaced apart from said base forming with said base a second water passage having openings allowing water from said body of water to pass therein; and,
    an second insert located in said second water passage with second length extending from said second inlet end toward said second outlet end and including a second air passage with a plurality of second air outlets along said second length; and
    supports connected to said float and said base and locating said base and said first wall and said second wall entirely between said bottom of said body of water and said top surface with said structure extending upwardly in said body of water above said float and the top surface of said body of water allowing water to exit same above said float and said body of water and then fall downwardly;
    wherein said source of pressurized air directs pressurized air into said first air passage in a direction opposite from directing air into said second air passage; and wherein said float includes a pair of hollow sealed floatable tubes connected to said base and supporting said first wall and said second wall in said body of water.

12. An aerator floatable in a body of water having a top surface and a bottom, comprising:
   a base supporting an aerator;
   a float connected to the base, the float providing sufficient buoyancy to support the aerator above the bottom of the body of water when the aerator is positioned in the body of water;
   wherein the aerator includes an air emitter located within a passage arranged to receive water from the body of water;
   wherein the air emitter is arranged to provide air into water contained within the passage to force the water in the passage to flow towards an outlet of the aerator; and
   wherein the outlet from the aerator is positioned above the top surface of the water when the aerator is positioned in the body of water so that water exiting the outlet falls back onto the top surface of the body of water.

13. The aerator of claim 12, wherein the aerator includes a frusto-conical portion extending upwardly towards the outlet.

14. The aerator of claim 12, wherein a bottom of the aerator is positioned at least 40 inches below the top surface of the body of water when the aerator is floating in the body of water.

15. The aerator of claim 12, wherein the float includes a first float and a second float; and
   wherein the first float and the second float are position on opposing sides of the aerator.

16. The aerator of claim 12, comprising adjustable rods supporting the aerator below the float such that the distance between a bottom of the aerator and the top surface of the body of water is adjustable.

17. The aerator of claim 12, wherein the air emitter has a triangular configuration.

18. The aerator of claim 12, wherein the passage is defined by a horizontally extending tube.

19. The aerator of claim 12, wherein the emitter includes a plurality of air outlets extending between an air passage and the passage having water.

20. An aerator comprising a pressurized air source and a conduit extending from the pressurized air source to the aerator of claim 12.

* * * * *